Figure 1:
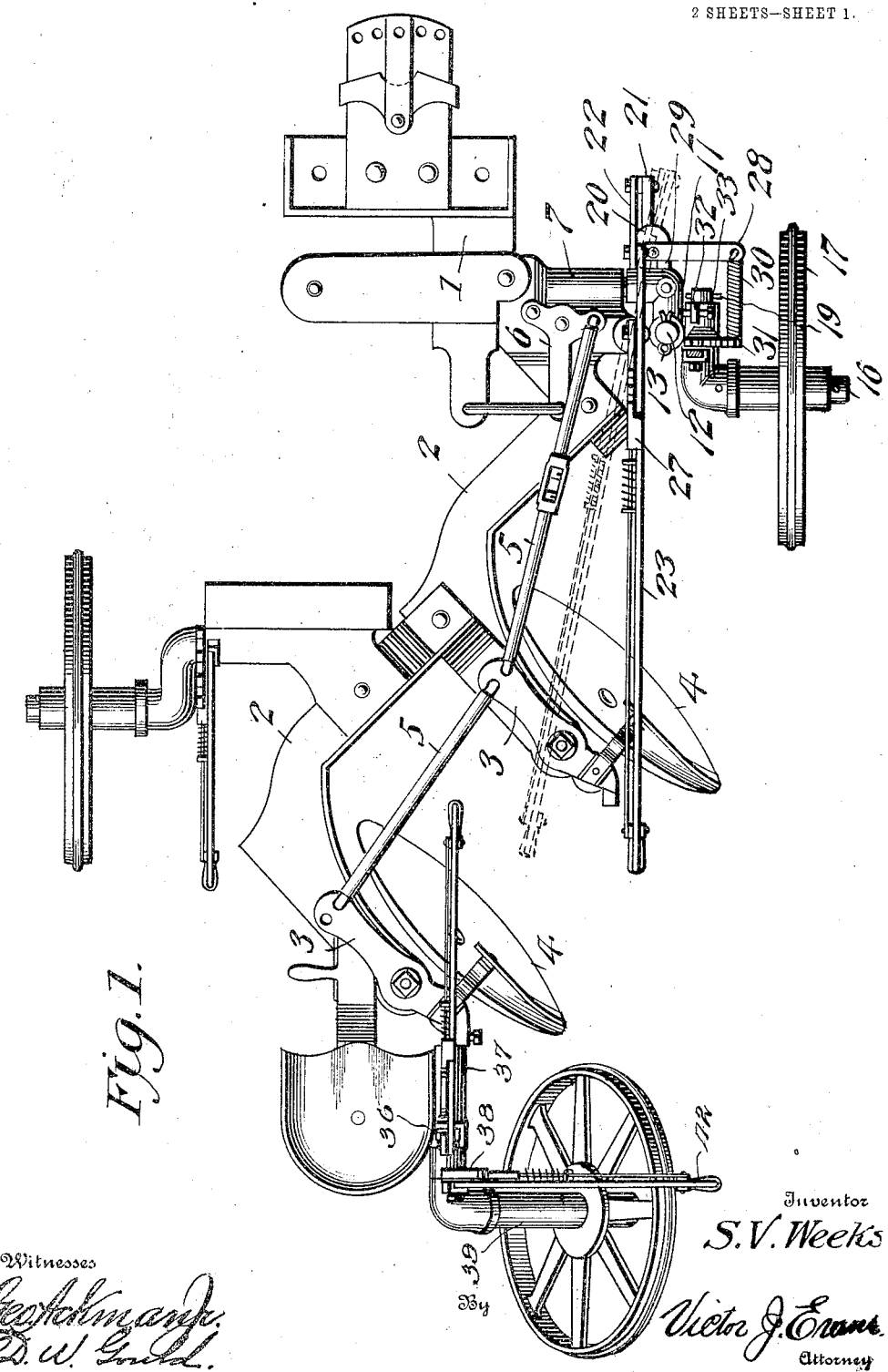

No. 828,160. PATENTED AUG. 7, 1906.
S. V. WEEKS.
PLOW.
APPLICATION FILED APR. 25, 1905.

2 SHEETS—SHEET 1.

Witnesses

Inventor
S. V. Weeks
By
Victor J. Evans.
Attorney

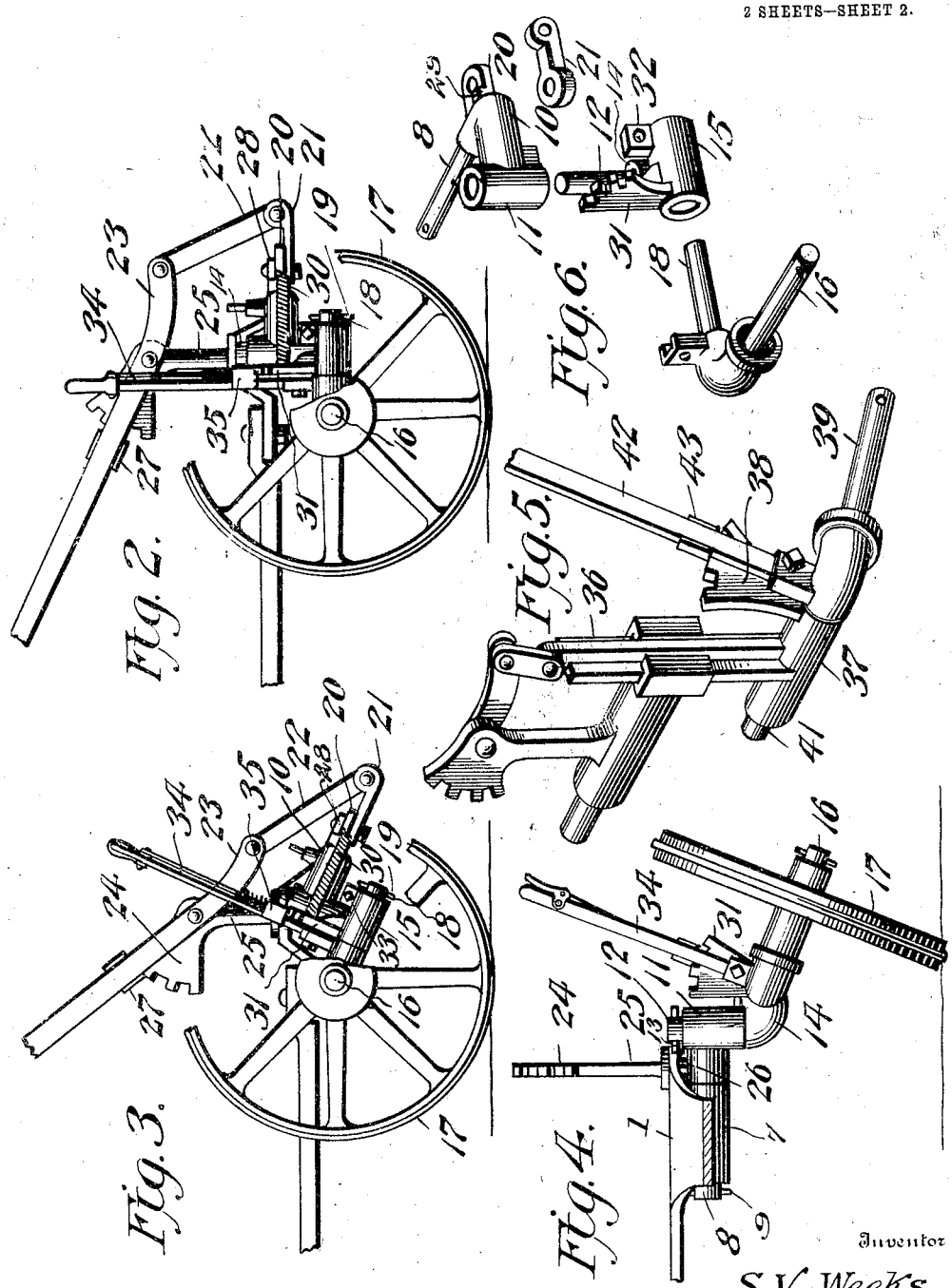

UNITED STATES PATENT OFFICE.

SAMUEL V. WEEKS, OF HIGHLAND PARK, TENNESSEE, ASSIGNOR TO VOLUNTEER DISK PLOW CO., OF CHATTANOOGA, TENNESSEE, A CORPORATION OF TENNESSEE.

PLOW.

No. 828,160.      Specification of Letters Patent.      Patented Aug. 7, 1906.

Application filed April 25, 1905. Serial No. 257,329.

*To all whom it may concern:*

Be it known that I, SAMUEL V. WEEKS, a citizen of the United States, residing at Highland Park, in the county of Chattanooga and State of Tennessee, have invented new and useful Improvements in Plows, of which the following is a specification.

The invention relates generally to an improvement in disk plows, and particularly to means whereby the effective operation of the cutting-disks may be adjustably controlled at the will of the operator.

The main object of the present invention is the production of means whereby the plow may be adjusted to accurately regulate the width of the furrow and determine the amount of cut of the disks.

Another object of the invention is the production of means for permitting the angular movement of the furrow-wheel with relation to the line of draft, whereby the plow is adapted for close turning at the end of the furrow.

With these objects in view the invention consists in certain details of construction and combinations of parts, which will be described in detail in the following specification, reference being had particularly to the accompanying drawings, in which—

Figure 1 is a top plan view of a disk plow constructed in accordance with my invention. Fig. 2 is a broken side elevation illustrating particularly the connection between the furrow-wheel and the plow structure, the parts being shown in normal position. Fig. 3 is a similar view, the parts being shown in position occupied after operation of the lever to vertically adjust the plow-frame. Fig. 4 is an end elevation illustrating the position of the parts after operation to alter the vertical inclination of the furrow-wheel. Fig. 5 is a detailed perspective illustrating the construction of the connection between the caster-wheel and plow-frame. Fig. 6 is a perspective illustrating the forward furrow-wheel connection, the parts being shown separated.

Referring to the drawings, wherein like parts are designated by similar reference-numerals throughout the several views, my improved adjusting means are illustrated in connection with a rotary disk-plow, including a main plate 1, to which is secured interchangeable duplicate disk-beams 2, carrying arms 3, to which is secured the disk 4. The arms 3 are connected by rods 5, suitably controlled through an adjusting-lever 6, mounted on the main plate.

So far as the novel features of the present invention are concerned no further detailed description of the plow structure is deemed necessary herein, as such forms the subject-matter of a copending application, filed February 28, 1905, Serial No. 247,703. It is to be understood, however, that I contemplate the use of the novel features hereinafter described in conjunction with any plow structure for which they may be adapted.

The main feature of the present invention resides in the connection of the furrow-wheel to the main plate of the plow structure, which is so constructed as to permit adjustment of the furrow-wheel to vary the width of the furrow cut by the disks and also to permit independent movement of the furrow-wheel to vary its lead. With this feature in view the main plate 1 of the plow structure is formed or provided adjacent the furrow-wheel with a bearing or sleeve 7 projecting laterally from said main plate. Within the sleeve is mounted a spindle 8, terminally projecting beyond the sleeve and secured against longitudinal movement therein by a suitable key 9. To the outer end of the spindle is connected a rearwardly-extending arm 10, terminally supporting a vertically-arranged sleeve 11.

A spindle 12 is revolubly mounted within the sleeve 11, being held therein by a key 13. The spindle is preferably enlarged at its lower end, as at 14, to bear against the lower end of the sleeve 11, and to said enlargement is secured or formed integral therewith a forwardly-projecting sleeve 15. The axle 16 for the furrow-wheel 17 is provided at its inner end with a forwardly-projecting arm 18, arranged at right angles to the axle 16 and being revolubly supported in the sleeve 15, being held against longitudinal movement therein by a key 19.

A lug 20 projects forwardly from the arm 10, forming a fixed part of said arm, to the under side of which lug is pivotally connected a bar 21, projecting forwardly and terminally connected to one end of a link 22, the opposite end of which is connected to the free end of a lever 23. 24 represents a segment-plate arranged for coöperation with said lever and fixedly supported at the upper end of a stub-shaft 25, which extends downwardly through the plate 1 and secured therebelow by a nut 26 in a manner to permit a revolution of said post in the operation of the parts. The lever, which is provided with the usual dog 27 for engagement with the notches in the segment 24, is pivotally supported near the lower end of said segment, whereby said lever, segment, and stub-shaft may be turned for a purpose hereinafter described.

The connection of the main frame of the plow with the furrow-wheel through the revoluble arrangement of the spindle 8 within the sleeve 7, in conjunction with the lever 23 and coöperating parts just described, provides for the vertical adjustment of the main frame with relation to the wheel, as it is evident that through a vertical movement of the handle end of the lever the spindle 8 will be rocked in the sleeve 7, and as the outer end of said spindle has a fixed point of support said rocking of the spindle will elevate or lower the frame with relation to the wheel—that is, with relation to the ground—whereby to adjust the cutting depth of the disk 4. In the use of this feature of the invention with a disk plow having a single cutting-disk the direct rearwardly projection of the lever 23 will position its handle end convenient to the seat of the operator; but when using two or more disks, as in a gang-plow, the normal projection of the lever will position its handle end remote from the seat of the operator, and it is the purpose of the structure described to practically meet this requirement. By loosening the nut 26 the handle end of the lever may be swung into convenient relation to the seat of the operator, the movement of the forward end of the lever being accommodated through the medium of the arm 21, which is pivotally connected to the lug 20, projecting from the arm 10.

It will thus be seen that the lever may be adjusted to position its handle end within convenient reach of the operator without regard to the number of disks used in the particular structure, whereby the operator may readily control the cutting depth of said disks without leaving his seat.

The structure, including the sleeve 11, spindle 12, and sleeve 15, are arranged to provide variation in the lead of the furrow-wheel, as the revoluble movement of the spindle 12 within the sleeve 11 will vary the angular relation of the furrow-wheel to the line of draft. To insure the return of said wheel to the desired normal position, I fixedly secure an arm 28 to the lug 20, said arm projecting laterally therefrom and bearing against a rear stop 29, formed on said lug. The outer or free terminal of the arm 28 is connected to one end of a coiled spring 30, which extends rearwardly from said arm and is connected to a segment-plate 31, which is formed integral with or fixedly secured to the sleeve 15. A lug 32 projects vertically from the sleeve 15, in which is threaded a set-screw 33, arranged transverse of said sleeve and terminally bearing against the outer edge of the arm 10.

From the construction described it will be noted that the furrow-wheel is free to caster toward the plow-frame in a rearward direction against the tension of the spring 30, but is positively limited against similar movement in a forward direction by the set-screw 33. Provision is thus made for accommodating said wheel in turning the plow, the spring 30 operating to quickly return the wheel to normal position as the draft on the plow is reëstablished. Under ordinary circumstances the set-screw is so positioned as to normally maintain the furrow-wheel in the direct line of draft; but in some instances, as in plowing hilly land, it is desirable that the furrow-wheel be given a lead from the line of draft, whereby to insure proper movement of the plow, as is well understood. Under these conditions the set-screw will be adjusted to limit the movement of the furrow-wheel, as desired, insuring the proper lead of said wheel when in normal position, it being understood that the spring 30 operates to return the furrow-wheel to the normal position, as controlled by said set-screw, immediately the direct draft on the plow is reëstablished.

The structure, including the sleeve 15 and forwardly-projecting arm 18 of the furrow-wheel axle, are arranged to permit variation in the vertical angle of the furrow-wheel, whereby to regulate the furrow width cut by the disks.

To manually control this adjustment of the furrow-wheel, hereinafter termed the "staggering" of the wheel, I secure a vertically-projecting lever 34 to the spindle 18, preferably projecting through an opening in the sleeve 15 immediately contiguous the segment 31, the lever being provided with the usual dog 35 for engagement with the notches in said segment. By this construction the lever may be moved toward or from the plow-frame to rock the spindle 18 in the sleeve 15 to give the furrow-wheel the desired amount of vertical inclination or stagger, the parts being locked in the desired position through engagement of the lever-dog with the segments.

As the furrow-wheel rides in the furrow and the next succeeding furrow will be spaced therefrom a distance equal to the distance between said furrow-wheel and the first disk, it is evident that if said furrow-wheel be inclined from the vertical to vary the distance of its bearing-point in the furrow from the first disk the distance of the furrow cut by said disk from the furrow in which the wheel is riding may be regulated. Furthermore, in plowing siding land the tendency of the plow in the lower side hill is to slide toward the plowed land and in upper side hill to slide toward the unplowed land, both of which disadvantages may be readily corrected by adjusting the inclination or stagger of the furrow-wheel to the extent desired.

In connection with the adjustment of the furrow-wheel to vary the width of cut of the next adjacent disk of the plow it has been found necessary to provide a similar adjustment for the last disk of the gang.

To provide for this adjustment, I secure on the block 36, which forms part of the structure of the copending application referred to and is adjustable to control the height of the plow-frame from the ground, a rearwardly-extending sleeve 37, to which is fixed a vertically-projecting segment 38. The axle 39 of the caster-wheel 40 is provided with a forwardly-projecting arm 41, arranged at right angles to the axle 39 and revolubly seated in the sleeve 37, being suitably keyed against longitudinal movement. A lever 42 is secured to the arm 41, projecting through an opening in the sleeve 37, immediately contiguous the segment 38, said lever having the ordinary dog 43 to coöperate with said segment. Operation of the lever will alter the vertical inclination or stagger of the caster-wheel with the effect to vary the cutting distance of the last disk of the gang in an obvious manner.

It is understood, of course, that, as usual in plow construction, the caster-wheel is normally arranged at a vertical inclination to offset the draw of the disks and that the means described for manually varying the inclination or stagger provides for efficiently controlling the width of cut of the last disk of the gang.

By virtue of the constructions and arrangement of parts as above described it will be noted that I am enabled to control the cutting depth of the disks by operation of the lever 23 and that said lever may be adjusted for convenient manipulation by the operator whether the plow carries one, two, or more disks; that the furrow-wheel is adapted for free and independent castering in a rearward direction to permit ready turning of the plow, returning to normal position under the influence of a spring, the castering of the wheel in a forward direction being limited by an adjustable means whereby to control the lead of the wheel as may be desired; that the vertical inclination or stagger of the furrow-wheel may be adjusted to absolutely control the furrow width cut by the adjacent disk, and that the rear caster-wheel may be suitably adjusted to vary its vertical inclination or stagger to control the cutting width of the last disk of the gang.

In the various adjustments described the parts are relatively arranged through the operation of a single lever, the position of the parts being absolutely controlled and locked in an adjusted position.

While I have shown and described the invention as applied to a disk gang-plow of peculiar construction, it is evident that it is equally applicable to a single disk or other plow.

It will be noted that the adjustments hereinbefore described are arranged for control of the front furrow-wheel whereby the movement of the plow is regulated and adjusted.

The construction and arrangement of parts described form my preferable embodiment of details; but I wish it undertsood that I do not limit myself thereto, as various changes and modifications may be resorted to without departing from the spirit and scope of the invention.

Having now described my invention, what I claim as new, and desire to secure by Letters Patent, is—

1. A plow including a main frame, a forward furrow-wheel supporting the frame, and a connection intermediate said furrow-wheel and the frame arranged to permit three distinct movements of the wheel and means for manually controlling two of said movements, the third movement being free of such control.

2. A plow including a main frame, a forward furrow-wheel and a connection intermediate said wheel and frame, said connection being adapted to permit a manually-controlled vertical movement, a free castering movement, and a manually-controlled vertical inclination of the wheel with relation to the frame.

3. A plow including a main frame, a forward furrow-wheel supporting the frame, a connection intermediate the wheel and frame to permit a vertical movement, a free castering movement, and a vertical inclination of the wheel with relation to the frame, and independent means for manually controlling the vertical movement and vertical inclination of the wheel.

4. A plow including a main frame, a wheel for supporting the frame, a sleeve carried by the frame, a spindle mounted in the sleeve and connected to the wheel, and means for rocking the spindle in the sleeve and thereby vertically adjusting the frame with relation to the wheel, said means being freely movable in a plane parallel to the plane of the frame, whereby to adapt said means for operation from varying positions on the frame.

5. A plow including a main frame, a wheel for supporting the frame, a sleeve carried by the frame, a spindle mounted in the sleeve, a connection between said spindle and wheel, and a lever for rocking the spindle in the sleeve and thereby vertically adjusting the frame with relation to the wheel, said lever being freely movable in a plane parallel to the plane of the frame.

6. A plow including a main frame, a forward furrow-wheel connected therewith, a spindle carried by the wheel, a sleeve movaably supported by the frame and adapted to revolubly receive the spindle and thereby permit free castering of the wheel in the rearward direction, means to automatically return the sleeve to normal position, and a connection between the spindle and wheel to permit a movement of said wheel independent of its castering movement.

7. A plow including a main frame, a forward furrow-wheel connected therewith, a spindle carried by the wheel, a sleeve supported by the frame and adapted to revolubly receive the spindle and permit free castering of the wheel in the rearward direction, means to automatically return said wheel to normal position, and adjustable means to limit the forward movement of the wheel.

8. A plow including a main frame, a sleeve carried thereby, a forward furrow-wheel, a spindle carried by the wheel, a movable connection intermediate said sleeve and spindle whereby to permit independent movement of the wheel in three directions, manually-operable means carried by the connection for controlling two of the movements of said wheel, the connection being arranged to permit the third movement free of said control.

9. A plow including a main frame, a sleeve carried thereby, a forward furrow-wheel, a spindle carried by the wheel, an intermediate member comprising a sleeve and spindle adapted to be revolubly supported in the sleeve on the frame, means for controlling the movement of said latter spindle with relation to the frame-sleeve and a connection to freely receive the sleeve of said intermediate member and engage the spindle of the wheel, means to control the movement of the wheel-spindle relative to said intermediate member, whereby the wheel is adapted for controlled movement in two directions with relation to the frame and for free movement in one direction.

In testimony whereof I affix my signature in presence of two witnesses.

SAMUEL V. WEEKS.

Witnesses:
  DAVID W. GOULD,
  JAMES F. NEALE.